United States Patent [19]
Kotani et al.

[11] Patent Number: 4,962,526
[45] Date of Patent: Oct. 9, 1990

[54] IMAGE DATA TRANSMISSION APPARATUS

[75] Inventors: Matahira Kotani, Ikoma; Masafumi Matsumoto, Takaichi; Mamoru Fujii, Nara; Motohiko Hayashi, Yamatokoriyama; Masayuki Hachinoda, Nara; Mitsunobu Kondo, Yokohama; Naomitsu Murata, Nagoya; Kouichi Mino, Higashikodaira, all of Japan

[73] Assignees: Nippon Telegraph, Tokyo; Telephone Corporation & Sharp Kabushiki Kaisha, Osaka, both of Japan

[21] Appl. No.: 323,852

[22] Filed: Mar. 15, 1989

[30] Foreign Application Priority Data

Mar. 15, 1988 [JP] Japan .................................. 63-62662
Mar. 15, 1988 [JP] Japan .................................. 63-62663

[51] Int. Cl.⁵ ..................... H04M 11/00; H04M 1/32; H04N 1/028; H04N 1/32
[52] U.S. Cl. ..................................... 379/100; 358/476; 358/473
[58] Field of Search ................. 379/100; 358/476, 473

[56] References Cited

U.S. PATENT DOCUMENTS 4,652,937  3/1987  Shimura et al. ..................... 358/476
4,716,291 12/1987  Sakamoto et al. ................... 358/473

FOREIGN PATENT DOCUMENTS 60-149257  8/1985  Japan .................................. 379/100

Primary Examiner—Jim F. Ng
Assistant Examiner—Stella L. Woo

[57] ABSTRACT

An image data transmission apparatus, which may be used as a facsimile apparatus, includes an image data reader which is detachably connected to the main body. The reader can read image data from an original fed past the reader, or it can be detached and used to scan an original. A device exists within the apparatus, which detects the mounting or unmounting of the reader, and if it is detected to be unmounted and not being used, power will be shut off. Further, a device exists, within the apparatus, which, when the reader is detected as mounted, will print read data. Also, when the reader is detected as unmounted, read data will be stored in memory. Thus, a speedy and power efficient image data transmission apparatus has been created.

10 Claims, 7 Drawing Sheets

IMAGE DATA TRANSMISSION APPARATUS

BACKGROUND OF THE INVENTION

1. Field of the Invention

The present invention relates to an image data transmission apparatus, appropriately used as a facsimile apparatus, which posses a detachable image reading unit.

2. Description of the Prior Art

With regard to the facsimile apparatus, the image of the original, inserted by an operator into the original inlet formed in the apparatus main body, is read. The read image data is then transmitted to other facsimile apparatus connected through a telephone line. The original inlet is formed in the vicinity of the reading unit such as a one-dimensional contact type image sensor installed in the apparatus main body, and its size corresponds to the length of the contact type image sensor.

In such a facsimile apparatus, it is impossible to read and transmit the image of large or bulky originals that cannot be inserted into the original inlet.

To solve such a problem, a reading unit may be installed with contains a having reading unit detachably connected to the apparatus main body of the facsimile apparatus. Thus, the image of the original manually by detaching the reading unit from the apparatus main body. In such a constructed facsimile apparatus, the following four functions may be assumed.

(1) The function, for detaching the reading unit from the apparatus main body, scanning the surface of original manually by the operator, and transmitting the thus read image data through the telephone line, is assumed.

(2) The function, for reading the image data by operating the reading unit manually, prior to transmission of the image data through the telephone line, storing the read image data in a memory, and transmitting the image data through the telephone line after all the image data to be transmitted has been stored in the memory, is assumed.

(3) The function, for inserting the original from the original inlet, with the reading unit mounted on the apparatus main body, to read the original image sequentially through the reading unit as the original is conveyed automatically, and transmitting the read image data directly, is assumed.

(4) The function, for inserting the original from the original inlet to copy the original, without connecting the facsimile apparatus to the telephone line, with the reading unit mounted on the apparatus main body, is assumed.

To realize these functions 1 to 4, for example, on the operation unit assembled in the apparatus main body of the facsimile apparatus, four function keys corresponding to these functions may be provided, but the controllability is lowered greatly when such function keys for each function are provided.

Meanwhile, in such facsimile a apparatus, during the reading action, a conveying roller, installed in the apparatus main body, is driven by a pulse motor or similar type device. Accordingly, in the case of functions 3 and 4 above, the original is automatically conveyed. In functions 1 and 2, however, since the reading unit is dismounted from the apparatus main body to be scanned on the original manually, it is not necessary to convey the original, however, the conveying roller is still driven. Therefore, the electric power is wastefully consumed by the rotation of the conveying roller.

Furthermore, in this facsimile apparatus, the reading processing is terminated in the following manner.

That is, in functions 1 and 2, the key provided for terminating the reading processing is manipulated. In functions 3 and 4, the end of the original is detected by a sensor, and the reading processing is automatically terminated by this detected signal. In the facsimile apparatus designed to perform reading processing only by scanning the reading unit manually, the reading processing is started and finished by the same key operation. However, considering misoperations when functions 3 and 4 are being used, such constitution is not suited to the facsimile apparatus possessing functions 1 to 4.

Therefore, as stated above, another key for terminating the reading processing of the image of the original must be additionally installed. Such addition of a key will complicate the structure, and induce errors due to misoperation. This, thereby worsens the controllability of the facsimile apparatus.

SUMMARY OF THE INVENTION

It is hence a primary object of the invention to present an image data transmission apparatus capable of saving power consumption without doing wasteful actions by solving the above-discussed technical problems.

To achieve the above object, the invention presents an image data transmission apparatus for transmitting the image data of the original, which is read by a detachable reading unit, detachably installed in the transmission apparatus main body. The image reading unit comprises:

a rotary roller rotating in contact with an original surface from which the image is to be read. It
Further includes a device for detecting the relative moving state between the image reading unit and the original, and leads out signals at every predetermined angular dislocation amount of the rotary roller. It further includes
an optical reading. It further includes
The transmission apparatus main body comprises:
an original conveying roller which is driven to rotate, and
a device for transmitting and receiving image data. Also included is a device for detecting the presence or absence of the mounting state of the image reading unit, as well as
a device for stopping the original conveying roller when the unmounted state of the image reading unit is detected by the mounting state detecting device.

In the image data transmission apparatus according to the invention, the image reading unit is detachably mounted on the transmission apparatus main body. While this image reading unit is dismounted from the transmission apparatus main body, there is no original to be conveyed, and it is not necessary to drive the original conveying roller. In such a case, the mounting state detecting detects detects the unmounted state of the image reading unit, and the control device stops the original conveying roller. Therefore, waste of electric power, due to purposeless driving of the original conveying roller, may be eliminated.

It is another object of the invention to present an image data transmission apparatus, of which image reading unit is detachably installed in the transmission apparatus main body, which is outstandingly enhanced in its controllability such that the mode of actions can be selected automatically.

To achieve the above object, this invention presents an image data transmission apparatus comprising a transmission apparatus main body and an image reading unit detachably mounted on this transmission apparatus main body, so as to transmit the image data by using a telephone line.

The transmission apparatus main body comprises:

A device for detecting the presence or absence of a mounting state of the image reading unit, and a device for detecting an open state of telephone line.

A printer is also included for printing out image data as memory for storing the image data.

Finally, a device for controlling the processing of the image data transmission apparatus is also included which reports to the output of the mounting state detecting device, the open state detecting device and the memory. While reading the image data, (a) in the case of detecting an the open state, the read image data may be transmitted. (b) In the case of a open state not being detected (b1) when the mounting state of the image reading unit is detected, the image data may be printed out by the printer. (b2) However, the mounting state of the image reading unit is not detected, the image data may be stored in the memory for transmitting.

According to the invention, when reading and transmitting the image, if the open state is detected, the read data is transmitted through the telephone line. If the open state is not detected, but when the mounting of the image reading unit is detected, the image data is printed out by the printing device. Furthermore, when neither the open state nor the mounting of image reading unit is detected, the image data is stored in the memory device.

Thus, the functions 1 to 4 mentioned in the Description of Prior Art may be automatically selected and set.

Therefore, in the image data transmission apparatus of the invention, the operator does not have to operate the buttons selectively when using the functions of the image data transmission apparatus selectively. As a result, errors due to misoperation of the image data transmission apparatus may be prevented, and its controllability is outstandingly enhanced.

In a preferred embodiment of the invention, the image reading unit comprises:

a rotary roller rotating in contact with the surface of the original from which the image is to be read and a device for detecting the relative moving state of the image reading unit and the original, leading out signals at every predetermined angular dislocation amount of the rotary roller.

It further includes contact type image sensor. The unit operates such that a controlling device stores the image data of every scan from the one-dimensional contact type image sensor in synchronism with the output of the relative moving state detecting device.

The invention further presents an image data transmission apparatus for transmitting the image data of the original which is read by the image reading unit, detachably mounted on the transmission apparatus main body, onto a transmission line.

The image reading unit comprises:

a rotary roller rotating in contact with the surface of the original from which the image is to be read and A device for detecting the relative moving state between the image reading unit and the original. It then leads out signals at every predetermined angular dislocation amount of the rotary roller.

The device further includes an optical reading device

The transmission apparatus main body comprises:

A device for terminating the reading action of the image and cancelling the connection of the transmission line for transmission of an image data when reading the original with the image reading unit dismounted from the transmission apparatus main body, and when the signal from the relative moving state detecting device stops for a predetermined period.

According to the invention, when transmitting the image data upon reading the image by scanning the image reading unit manually over the surface of the original with the image reading unit dismounted from the transmission apparatus main body, its termination is effected as follows. That is, when a signal is not led out for a predetermined period from the angular dislocation detecting device, for leading out signals at every predetermined angular dislocation amount of the rotary roller, the control device terminates the reading action of the image and cancels the connection of the communication line for transmission of the image data. Therefore, the operator has only to stop scanning the image reading unit for a specified period to terminate transmission of the image data. Thus, the controllability of the image data transmission apparatus may be enhanced.

BRIEF DESCRIPTION OF THE DRAWINGS

These and other objects of the invention, as well as the features and advantages thereof, will be better understood and appreciated from the following detailed description taken in conjunction with the drawings, in which.

DETAILED DESCRIPTION OF THE PREFERRED EMBODIMENTS

Referring now to the drawings, preferred embodiments of the invention are described in details below.

EXAMPLE

Figure 1:
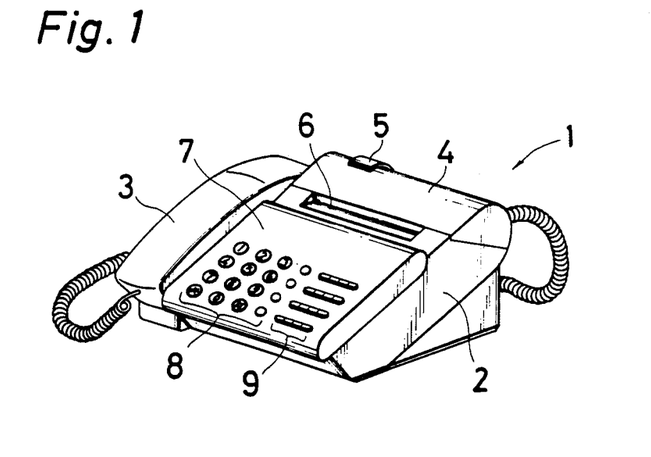
FIG. 1 is a perspective view showing the outline of a telephone set 1 as an embodiment of the invention.

FIG. 1 is a perspective view showing the outline of a telephone set 1, which is an image data transmission apparatus conforming to an embodiment of the invention. The telephone set 1 is designed so as to also possess a function for facsimile, and comprises an apparatus main body 2 and a handset 3, among others. The apparatus main body 2 is equipped with a detachable reading unit 4, and a start switch 5 for instructing the start of reading of the original when disposed in the upper part thereof. When the reading unit 4 is mounted on the apparatus main body 2, an inlet 6, for inserting the original, is formed in relation to the reading unit 4.

The apparatus main body 2 further comprises, in the vicinity of the inlet 6, an operation panel 7 in a manner to freely dislocate angularly around the axial line crossing the inserting direction of the original at one end. That is the axial line, approximately parallel to the longitudinal direction of the inlet 6, is when angular dislocation of the operation panel 7 occurs. This operation panel 7 contains a numeric key group 8 for selecting a number to be dialed, and a function key group 9 for specifying various functions.

Figure 2:
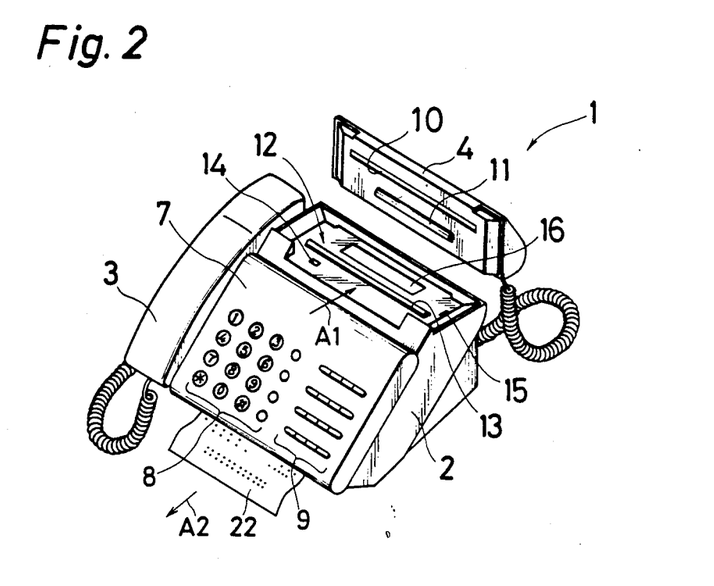
FIG. 2 is a perspective view showing the dismounted state of a reading unit 4 of the telephone set 1.

FIG. 2 is a perspective view showing the dismounted state of the reading unit 4 from the apparatus main body 2. The reading unit 4 contains a one-dimensional contact type image sensor (hereinafter called image sensor) 10 and a detection roller 11 which is described below.

In the mounting part 12, for mounting the reading unit 4 of the apparatus main body 2, a conveying roller 13 for conveying the original is disposed. At the operation panel 7 side of this conveying roller, that is, at the upstream side of the original conveying direction (the direction of arrow Al in FIG. 2), an original sensor 14, for detecting the insertion of an original, is provided. Moreover, a detecting sensor 15 is used as the mounting state detecting device for detecting mounting or dismounting, of the reading unit 4, on or off the apparatus main body 2. It is disposed in the vicinity of the end of the mounting part 12.

Figure 3:
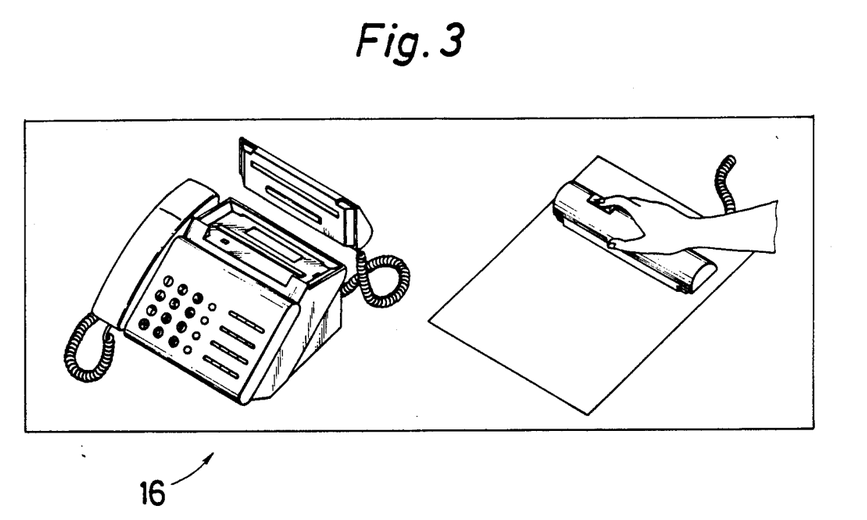
FIG. 3 is a plan view of a friction reducing sheet 16.

At the bottom of the mounting part 12 a friction reducing sheet 16 which is a sheet member made of material, which has a low coefficient of friction, and is disposed at the position opposite to the detection roller 11, with the reading unit 4 mounted on the mounting part 12. On the surface of this friction reducing sheet 16, for example as shown in FIG. 3, an illustration is printed to explain the handling manner of the reading unit 4.

In this telephone set 1, when recording the image data in the case of reception of image data and so on, a thermal recording paper 22, on which the image was recorded, is conveyed from the lower part of the operation panel 7 in the direction of arrow A2 in FIG. 2, and is discharged out of the apparatus main body 2.

Figure 4:
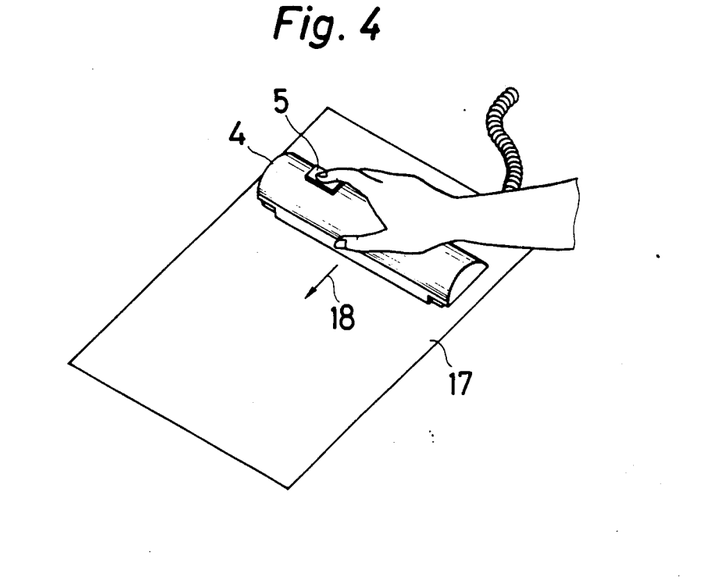
FIG. 4 is a perspective view showing the state of use with the reading unit 4 dismounted from the apparatus main body 2.

FIG. 4 is a perspective view showing the use of the reading unit 4 when it is dismounted from the apparatus main body 2. When reading an original which is too big or too bulky, such as a book, to be inserted into the original inlet 6, the reading unit 4 is detached from the apparatus main body 2. In this case, the operator puts the reading unit 4 on the original 17 so that the image sensor 10 of the reading unit 4 faces the surface of the original 17, and presses the start switch 5. He then moves the reading unit 4 in the direction of arrow 18 in FIG. 4. In this way, the image sensor 10 scans the original 17, and the original image is read. At this time, since the detection roller 11 rotates in proportion to the dislocation of the reading unit 4, the reading position may be detected by, for example, a rotary encoder disposed in relation to the detection roller 11.

Figure 5:
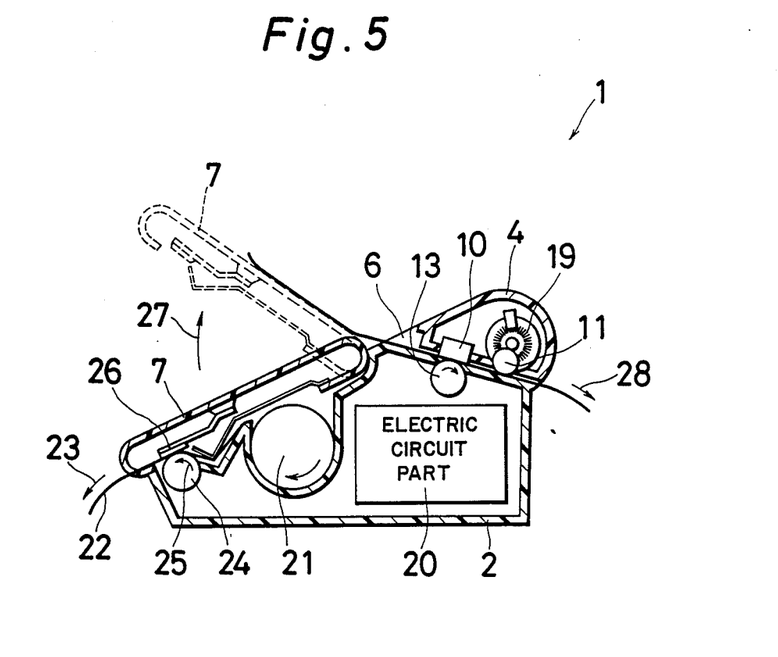
FIG. 5 is a sectional view showing a simplified structure of the telephone set 1.

FIG. 5 is a longitudinal sectional view showing a simplified structure of the telephone set 1. A rotary encoder 19 is disposed in relation to the detection roller 11, and its output is applied to an electric circuit part 20 assembled in the apparatus main body 2. Therefore, when the reading unit 4 is dismounted from the apparatus main body 2, the information about the reading position of the image sensor 10 is fed into the electric circuit part 20.

In the apparatus main body 2, near the end, at the opposite side of the inlet 6 of the operation panel 7, there is disposed a platen 24 for conveying the thermal recording paper 22 supplied from the recording paper roll 21 in the arrow 23 direction. When recording the image, this platen 24 is angularly dislocated in the direction of arrow 25 by a pulse motor (not shown) or the like. In relation to the platen 24, a thermal head 26 is disposed. The thermal head 26 is composed of plural heating resistance elements arranged in dot forms along the longitudinal direction of the platen 24.

When recording the image information onto the thermal recording paper 22, the platen 24 is angularly dislocated in the direction of arrow 25, and the thermal head 26 is heated and driven in correspondence to the image to be recorded.

In the telephone set 1, when the function key group 9 is operated and the facsimile function is selected, the operation panel 7 is angularly dislocated in the direction of arrow 27 by the operator., and is supported by a structure (not shown) at the position indicated by broken line in FIG. 5. In such state, a plurality of originals can be put on the operation panel 7, and the operation panel 7 plays the role as the original stacker for stacking the originals. The plurality of originals put on the operation panel 7 are led one by one from the inlet 6 to the vicinity of the image sensor 10, and are conveyed by the conveying roller 13, which is driven by a pulse motor or the like, at a constant speed in the direction of arrow 28, while the original image is being read.

Figure 6:
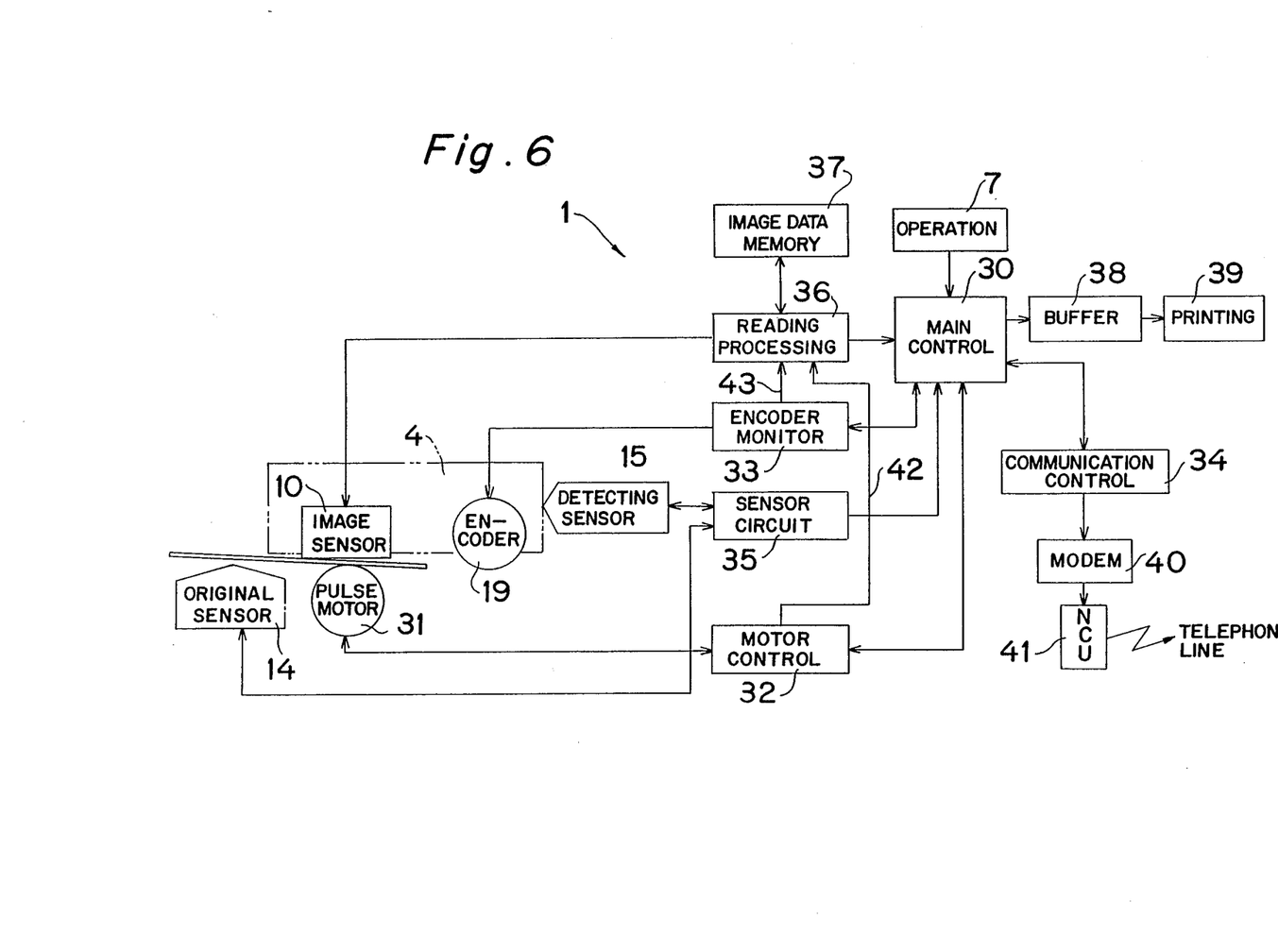
FIG. 6 is a block diagram showing an electric composition of the telephone set 1, and FIGS. 7(1)–7(3) comprise a flowchart for explaining the operation relating to the image data transmission processing of the telephone set 1.
Figure 7:
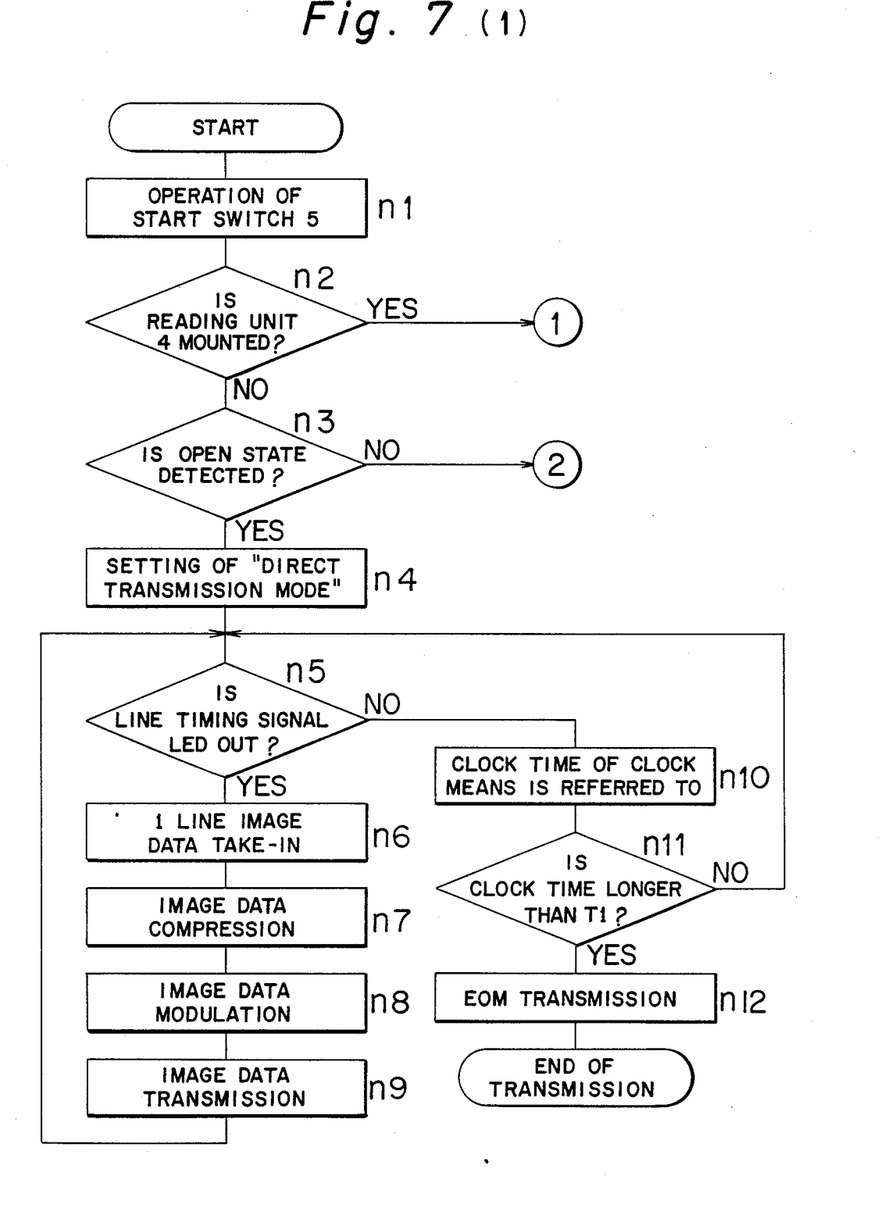

FIG. 6 is a block diagram showing a basic structure of the part relating to the image data transmission of the telephone set 1. In the telephone set 1, the following four operation modes are automatically set in relation to the reading action of the reading unit 4.

(1) Direct transmission mode

With the reading unit 4 dismounted from the apparatus main body 2, the original is manually scanned as shown in FIG. 4, and thus read image data is transmitted through telephone line directly.

(2) Memory transmission mode

With the reading unit 4 dismounted from the apparatus main body 2, the original is manually scanned as shown in FIG. 4, and the read image data is once stored in the memory. After storing all image data on the original surface, the image data is read out from the memory to be transmitted.

(3) Ordinary transmission mode

With the reading unit 4 mounted on the apparatus main body 2, the original is inserted into the inlet 6, and is conveyed by the conveying roller 13. Thus occurs while the original image is read by the image sensor 10, and thus read image data is transmitted directly.

(4) Copy mode

With the reading unit 4 mounted on the apparatus main body 2, without connecting the telephone set 1 to the telephone line, the original is inserted from the inlet 6. It is then conveyed by the conveying roller 13, while the original image is read by the image sensor 10. Thus, from recorded image data, a copy image of the original is obtained on the thermal recording paper 22 by the function of the thermal head 26 and others.

These modes are selected by the processing in the main control part 30 of the telephone set 1 as described below. To the main control part 30, signals are fed from the motor control part 32 and encoder 19 for controlling the operation of the pulse motor 31 for driving the conveying roller 13, and an encoder monitor part 33 for converting the signals into reading position mode,' and when the open state is not detected, the operation information, and a communication control part 34 for controlling the line connection between the telephone set 1 and telephone line are connected thereto. Also to the main control part 30, signals corresponding to the operation of the numeric key group 8 and function key group 9 are given. The signals are also fed from the sensor circuit part 35. To which the original sensor 14 and detecting sensor 15 are connected.

The image data from the image sensor 10 is taken into the reading processing part 36, with every image data corresponding to one scanning line (hereinafter called line). To the main control part 30, the image data is sent from this reading processing part 36. To the reading processing part 36, an image data memory 37 is connected as the memory device for storing the image data for a plurality of lines. When copying to the thermal recording paper 22, the image data sent from the reading processing part 36 to the main control part 30 is applied, through a buffer 38, to a printing part 39. The printing part 39 comprises circuits for driving the thermal head 26 and for driving and controlling the platen 24.

When transmitting image data through the telephone line, the image data is sent from the main control part 30 to the communication control part 34 which is the open state detecting device. It is then compressed, and is modulated in a modem 40, which is used for modulating and demodulating the conveying signal transmitted and received through the telephone line, and is sent out into the telephone line from a network control unit (NCU) 41.

While the reading unit 4 is mounted on the apparatus main body 2, the reading processing part 36 takes in the image data in synchronization with the rotation of the pulse motor 31. The line timing signal for defining such image data take-in timing is sent from the motor control part 32 to the reading processing part 36, through a line 42. While the reading unit 4 is dismounted from the apparatus main body 2, the pulse motor 31 is not rotated, and the reading processing part 36 must take in the image data according to the reading position information from the encoder 19. The line timing signal for reading the image data in such case a is sent from the encoder monitor part 33 to the reading processing part 36, through a line 43.

Termination of reading of image data in such case, when the reading unit 4 is mounted on the apparatus main body 2, is affected by the signal from the original sensor 14 as described below. If the reading unit 4 is not mounted on the apparatus main body 2, when the line timing signal from the encoder monitor part 33 is not led out for a specified period, reading action is terminated by the judgement of the main control part 30.

FIG. 7 is a flowchart for explaining the operation relating to the image data transmission processing of the telephone set 1. At step n1 in FIG. 7 (1), when the start switch 5 is pressed to instruct the reading of the original, it is judged whether or not the reading unit 4 is mounted on the mounting part 12 of the apparatus main body 2 according to the signal from the detecting sensor 15, at step n2. When it is judged that the reading unit 4 is mounted on the apparatus main body 2, the operation advances to step n21 in FIG. 7 (3), and if not mounted, it goes to step n3.

At step n3, in the main control part 30, on the basis of the line state information given from the communication control part 34, it is judged whether the facsimile apparatus at the destination is connected to the telephone line or not. That is, it is judged whether or not open state of the telephone line is detected. When the open state is not detected, the operation advances to step n13 in FIG. 7 (2), and the setting process corresponding to the "memory transmission mode" affected. When the open state is detected, the setting process corresponding to the "direct transmission mode" is affected at step n4.

Moving from step n4 to step n5, it is judged whether or not the line timing signal is led from the encoder monitor part 33 to the line 43. When the line timing signal is not led out, the operation advances to step n10. Further, when the line timing signal is sent to the reading processing part 36, the image data of one line is sent to the image processing part 36 in synchronism with the line timing signal.

In succession, at step n7, the image data of one line is sent from the reading processing part 36 to the communication control part 34 through the main control part 30. This image data is then compressed in the communication control part 34. At the next step n8, the compressed image data is modulated in the modem 40. At step n9 the image data is transmitted from the NCU 41 through the telephone line. Afterward, the processing returns to step n5.

At step n5, when the line timing signal is not led out into the line 43, the operation advances to step n10. Then the clock time of the clock device, (not shown) incorporated in the main control part 30, is referred to. This clock device is initialized and started up when the line timing signal is sent to the reading processing part 36.

At step n11, it is judged whether or not the clock time in the clock device is longer than a predetermined time T1. This time T1 is the duration preliminarily determined in the main control part 30, so as to detect the end of reading of an original by manual scanning by the operator when the reading unit 4 is dismounted from the apparatus main body 2 and used.

If the clock time is judged to be less than the time T1 by the clock device at step n11, the operation returns to step n5. When it judged to be not less than the time T1, the operation advances to step n12. At step n12, the main control part 30 sends out the end-of-message (EOM) signal to the facsimile at the destination through the communication control part 34, modem 40 and NCU 41, thereby terminating the transmission of image data.

At step n3, when the open state is not detected, the operation advances to step n13 in FIG. 7 (2), and the setting process corresponding to the "memory transmission mode" is affected.

At step n14, it is judged whether or not the line timing signal is sent to the reading processing part 36 from the encoder monitor part 33. If it is not sent, the operation advances to step n19. When the line timing signal is sent, the operation goes to step n15.

At step n15, the reading processing part 36 receives in the image data for one line, from the image sensor 10, in synchronization with the line timing signal sent from the line 43.

This image data, at step n16, is sent from the main control part 30 to the buffer 38, and is printed out on the thermal recording paper by the function of the printing part 39. It is also compressed at step n17, and is stored in the image data memory 37 at step n18. Afterwards, the processing returns to step n14.

At step n14, when it is judged that the line timing signal is not led out from the encoder monitor part 33, the clock time of the clock device is referred to at step n19. There, it is judged whether or not the clock time is more than the time T1 at step n20. If the clock time is shorter than the time T1, the operation returns to step n14. When it is longer than the time T1, the memory processing of the image data to the image data memory 37 is terminated.

Afterwards, in the main control part 30, when the open state of the telephone line is detected, the reading processing part 36 reads the already stored image data from the image data memory 37, and sends it to the main control part 30. Thus, the image data sent given to the main control part 30 is transmitted to the facsimile apparatus at the destination by the function of the main control part 30, modem 40, NCU 41 and others.

At step n2, when it is judged that the reading unit 4 is mounted on the apparatus main body 2, the operation advances to step n21 in FIG. 7 (3). There it is judged whether or not the open state of the telephone line is detected. When the open state is detected, the operation skips to step n22 to be set in the "ordinary transmission mode. When the open state is not detected, the operation advances to step n30 to be set in the "copy mode."

When set in the "ordinary transmission mode" at step n22, a pulse motor is driven for the portion of one line at step n23.

At step n24, in synchronism with the driving of the pulse motor 31, the image data of one line is read into the reading processing part 36 from the image sensor 10. The read image data is applied to be compressed in the communication control part 34 through the main control part 30 at steps n25, n26, and the compressed image data is modulated in the modem 40. In succession, at step n27, the image data is transmitted from the NCU 41.

At step n28, according to the signal from the original sensor 14, it is judged whether or not the end of the original is detected or not, and when it is not detected, the operation returns to step n23. When it is detected, it advances to step n29. At step n29, the main control part 30 sends out a post message signal to indicate the termination of transmission of the image data in one page of the original through the communication control part 34, modem 40 and NCU 41. This thereby finishes the transmission of image data for one page.

At step n30, when the "copy mode" is set, the pulse motor 31 is driven for a portion of one line at step n31. In synchronism with this pulse motor driving, at step n32, the reading processing part 36 receives in the image data from the image sensor 10. At step n33, the image data received by the reading processing part 36 is sent from the main control part 30 to the buffer 38. Then, the print output on the thermal recording paper, based on the read image data, is carried out in the printing part 39.

At step n34, it is judged whether or not the end of the original is detected on the basis of the signal from the original sensor 14. When it is not detected, the operation returns to step n31. When it is detected, the copy action is over.

Thus, in this embodiment, the action modes of the telephone set 1 that can be set in correspondence with the reading action of the reading unit 4. That is, the direct transmission mode, memory transmission mode, ordinary transmission mode, and copy mode, can be automatically set in the main control part 30, on the basis of the signal from the detecting sensor 15 and the information received from the communication control part 34 about the open state of the telephone line.

When the open state is detected, while the reading unit 4 is not mounted on the apparatus main body 2, the "direct transmission mode" is selected. Further, when the open state is not detected, the "memory transmission mode" is selected. While the reading unit 4 is mounted on the apparatus main body 2, when the open state is detected, the "ordinary transmission mode" is set. Further, when the open state is not detected, the "copy mode" is set.

Thus, since the operation modes about the transmission of the image data of the telephone set 1 are set automatically, it is not necessary to install function keys or others for setting the operation modes on the operation panel 7. Thus the number of function keys may be decreased. Therefore, when setting the operation modes, it is not necessary to operate the function keys. Thus the controllability of the telephone set 1 is enhanced superbly.

Also, when the unmounted state of the reading unit 4 on the apparatus main body 2 is detected by the detecting sensor 15, if the reading of the original is started by the start switch 5, the pulse motor 31 is not rotated, and the conveying roller 13 is not driven. Therefore, wasteful power consumption by unnecessary rotation of the conveying roller 13 may be eliminated.

Furthermore, when using the reading unit 4 by dismounting it from the apparatus main body 2, the reading action of the image data is automatically terminated when the reading unit 4 is stopped still for a while. Therefore, it is not necessary to install a function key for finishing the original reading action on the operation panel 7. Thus the number of function keys may be further decreased. Also, when finishing the original reading action, misoperation is eliminated because it not necessary to manipulate any function key. Thus the controllability of the telephone set 1 will be furthermore enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image data transmission apparatus for transmitting image data of an original being read by a reading unit, detachably connected to the transmission apparatus main body, the image reading unit comprising:
   rotary roller means for rotating in contact with the original from which the image data is to be read,
   means for detecting the relative moving state of the image reading unit and the original in response to said rotary roller means, and sending out signals at every predetermined angular dislocation amount of the rotary roller means, and
   optical reading means for reading said image data from the original; and
   the transmission apparatus main body comprising, original conveying means for conveying an original past the image reading unit when the image reading unit is in a state mounted to said transmission apparatus main body, means for transmitting and receiving image data, means for detecting a presence or absence of a mounting state of the image reading unit on the main body, and means for stopping the original conveying means when the absence of the mounting state of the image reading unit is detected by the detecting means.

2. An image data transmission apparatus for transmitting image data of an original being read by an image reading unit, detachably mounted on the transmission apparatus main body, into a connected transmission line, the image reading unit comprising:

rotary roller means for rotating in contact with the surface of the original from which the image data is to be read, detecting means or detecting he relative moving state of the image reading unit and the original in response to said rotary roller, means, and sending out signals at every predetermined angular dislocation amount of the rotary roller means, and optical reading means for reading the image data from the original; and the transmission apparatus man body comprising, means for terminating the reading of the image data by said optical reading means and cancelling connection of the transmission line for transmission of the image data, when reading the original with the image reading unit dismounted from the transmission apparatus main body, and when the signals from the detecting means stop being sent out for a predetermined period of time.

3. An image data transmission apparatus comprising a transmission apparatus main body and an image reading unit, detachably mounted on this transmission apparatus main body, for transmitting image data over telephone line, the transmission apparatus main body comprising, detecting means for detecting presence or absence of the image reading unit being mounted on the transmission apparatus main body;

line detecting means for detecting an open state of said telephone line for transmitting the image data;

printing means for printing out the image data;

memory means for storing the image data, and means for controlling the processing of the image data transmission apparatus, responding to the output of the detecting means, the line detecting means and the memory means, so that, upon reading the image data and detecting the open state of the telephone line, the read image data may be transmitted; and upon not detecting the open state of the telephone line and detecting the presence of the image reading unit being mounted, the image data may be printed out by the printing means, and when detecting the absence of the image reading unit being mounted, the image of data being stored in the memory means for transmitting at a later time.

4. An image data transmission apparatus of claim 3, wherein the image reading unit comprises:

rotary roller means for rotating in contact with the surface of the original from which tithe image data is to be read, detecting means for detecting the relative moving state of the image reading unit and the original in response to said rotary roller means, and sending out signals at every predetermined angular dislocation amount of the rotary roller means, and a line-dimensional contact type image sensor means for scanning said image data from the original, wherein a controlling means stores the image data of every scan from the one-dimensional contact type image sensor means in synchronism with the output of the signals sent from the detecting means.

5. An image data transmission apparatus for transmitting image data, read from an original by a detachably connected reading unit, which can be in a mounted state attached to the main body of the image data transmission apparatus so as to read an original as it is conveyed past the reading unit or in an unmounted state so as to read an original by the reading unit being moved relative to said original, the apparatus comprising:

conveying means, which is driven to rotate upon supplying power to said apparatus, for conveying an original past the reading unit when the reading unit is in a mounted state;

detecting means for detecting the state of the reading unit as being mounted or unmounted;

stopping means for stopping the rotating of said conveying means upon said detecting means detecting that the reading unit is in an unmounted state.

6. An image data transmission apparatus for transmitting image data across a telephone line read from an original by a detachably connected reading unit, which can be in a mounted state attached to the main body of the image data transmission apparatus so as to read an original as it is conveyed past the reading unit or in an unmounted state so as to read an original by the reading unit being moved relative to said original, the apparatus comprising:

the reading unit reading an original and producing image data;

telephone line detecting means for detecting whether or not the telephone line is open, said produced image data being transmitted across the telephone line upon said telephone line detecting means detecting said telephone line as being open;

detecting means for detecting the state of the reading unit as being mounted or unmounted;

printing means for printing said produced image data upon detecting that the telephone line is not open and detecting the reading unit as being mounted; and memory means for storing said produced image data upon detecting that the telephone line is not open and detecting the reading unit as being unmounted.

7. An image data transmission apparatus for transmitting image data over a phone line read from an original by a detachably connected reading unit, which can be in a mounted state attached to the main body of the image data transmission apparatus so as to read an original as it is conveyed past the reading unit or in an unmounted state so as to read an original by the reading unit being moved relative to said original, the reading unit comprising:

roller means for rotating in contact with an original from which image data is to be read;

movement detecting means for detecting movement of the reading unit relative to an original, and sending signals to the main body at every rotation of said roller means; and reading means of reading image data from an original in connection with said signals sent out from said detecting means;

the main body including, connection means connecting said apparatus to another similar apparatus over the phone line for transmission of said image data;

detecting means for detecting the state of the reading unit as being mounted or unmounted;

termination means for terminating operation of the reading unit and said connection of said connection means to another similar apparatus upon detecting the reading unit is in an unmounted state and said movement detecting means not sending signals to the main body for a predetermined period of time.

8. A method for transmitting image data across a telephone line, read from an original by a detachably connected reading unit, which can be in a mounted stated attached to the main body of the image data transmission apparatus so as to read an original as it is conveyed past the reading unit or in an unmounted state so as to read an original by the reading unit being moved relative to the original, the method comprising the steps of:

(a) reading an original and producing image data;
 (b) detecting whether or not the telephone line is open, said produced image data being transmitted across the telephone line upon detecting the telephone line as being open;
   detecting the state of the reading unit as being mounted or unmounted;
 (d) printing said produced image data upon detecting that the telephone line is not open and detecting the reading unit as being mounted; and
 (e) storing said produced image data upon detecting that the telephone line is not open and detecting the reading unit as being mounted.

9. A method for transmitting image data, read from an original by a detachably connected reading unit, which can be in a mounted state attached to the main body of an image data transmission apparatus so as to read an original as it si conveyed past the reading unit or in an unmounted state so as to read an original by the reading unit being moved relative to the original, the method comprising the steps of:

(a) conveying an original past the reading unit by use of a conveying means, which is driven to rotate upon supplying power to the apparatus, when the reading unit is in a mounted state;
 (b) detecting the state of the reading unit as being mounted or unmounted;
 (c) stopping the rotating of the conveying means upon detecting that the reading unit is in an unmounted state.

10. A method for transmitting image data, over a phone line, read from an original by a detachably connected reading unit, which can be in a mounted state attached to the main body of an image data transmission apparatus so as to read an original as it is conveyed past the reading unit or in an unmounted state so as to read an original by said reading unit being moved relative to the original, the method comprising the steps of:

(a) rotating a roller means in the reading unit, in contact with an original, from which image data is to be read;
 (b) detecting movement of the reading unit relative to an original, by a movement detecting means, and sending signals to the main body at every rotation of said roller means;
 (c) reading image data from an original in connection with said signals sent out at every rotation of said roller means;
 (d) connecting the apparatus to another similar apparatus over the phone line for transmission of said image data;
 (e) detecting the state of the reading unit as being mounted or unmounted; and
 (f) terminating operation of the reading unit and said connection to another similar apparatus upon detecting the reading unit is in an unmounted state and the movement detecting means not sending signals to the main body for a predetermined period of time.

* * * * *